Patented Jan. 5, 1932

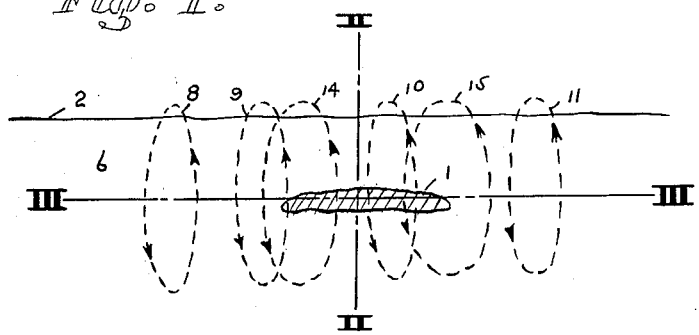
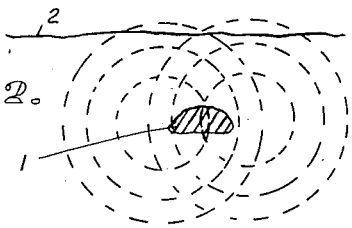
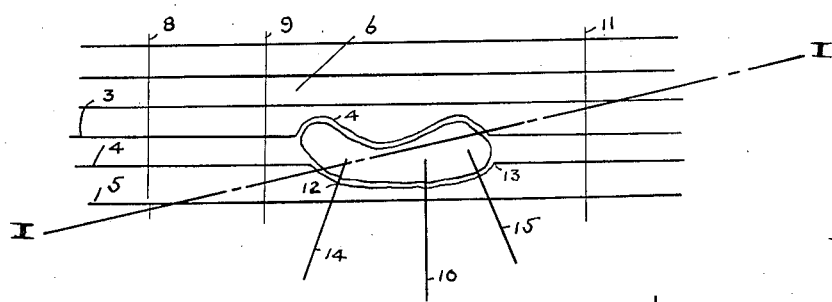
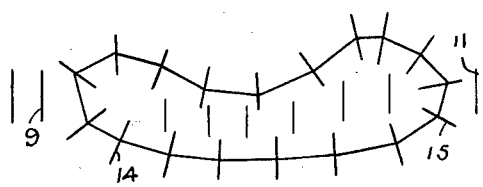
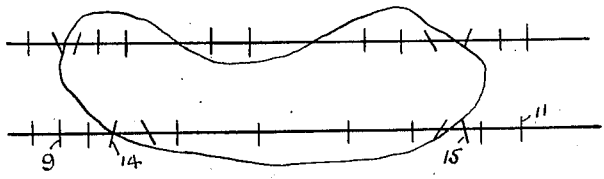

1,839,732

UNITED STATES PATENT OFFICE

CARL H. BEAL, OF SAN MATEO, AND CHARLES E. MILLER, OF SAN FRANCISCO, CALIFORNIA, ASSIGNORS, BY MESNE ASSIGNMENTS, TO WESTERN COMPANY, A CORPORATION OF NEVADA

PROCESS FOR DETERMINING THE LOCATION OF SUBSTANCES HAVING A DIFFERENT ELECTRICAL CONDUCTIVITY FROM SURROUNDING MEDIA

Application filed July 7, 1925. Serial No. 41,930.

Our invention is particularly applicable to the locating of large bodies of oil, ore, or such subterranean substances as may have an electrical conductivity materially different from their surrounding media.

These objects we accomplish by determining the direction of the electromagnetic field accompanying a current flow through the surrounding media, at a large number of points spaced over any given area, and we have found that the direction of the electromagnetic field will remain substantially constant where the electric conductivity of the earth or media thereunder is constant or homogeneous, but where there is a disturbance in the conductivity of said media there will be a corresponding distortion in the electromagnetic field thereover, thus enabling us, by the plotting of such distortions in any plane, to discover the outlines of the substance or body having different electric conductivity from the surrounding media.

Our invention is applicable to the discovery of substances or masses whether their conductivities be greater or less than the surrounding media; to secure the indications and plot the outlines of the substances it being only necessary that the conductivity should be different from the surrounding media.

For example where it is desired to establish a map or outline of a subterranean oil deposit we first establish a radio transmitting station adapted to send out radio signals and preferably within thirty miles of the land being surveyed. We then set up a receiving loop and accessory apparatus adapted to receive and make apparent the said signals and we adjust the loop so as to reduce the signal to a minium that is to secure a zero indication.

The angle which the plane of the loop then bears with respect to a line through the loop and the transmitting station will be constant over any portion of the earth's surface overlying substances and media of equal conductivity.

We have found that the angle made by the loop plane, with a line through the transmitting station, and plotted for a large number of points over any area being investigated, will show at points distortions positioned over the boundaries of masses having different electric conductivity from their surrounding media, said distortions occurring directly above said boundaries. That is to say, the distorting effect resulting from the presence of the mass of different electrical conductivity from the surrounding media is detected at points substantially vertically above the conditions causing the distortion. Thus bearings taken on the transmitting station at points where distortion is present do not indicate the true line passing thru both the point of transmission and the point of reception, as would be the case if no distortion were present.

The action which takes place and the cause of the effects which we have above set forth is rather obscure and without limiting ourselves by theories or explanations, we suggest the following as a possible explanation of the said effects.

The radio transmitter which is relatively at a considerable distance from the field to be investigated throws out a series of electric current impulses, or oscillations of the electrons, which currents flow through the earth's strata, the said strata acting as conductors therefor. The path of these currents will be generally parallel with the surface of the ground and may be conceived to take place on paths or lines radially from the transmitter, through the said strata, thereby setting up a series of electro-magnetic fields radiating from the said lines of current and we then determine the planes in which these electromagnetic fields are propagated, as they pass through the earth's surface above the field being investigated.

The observations whereby the direction of the electro-magnetic fields is determined at a plurality of different stations, may be secured by employing any of a variety of apparatus, but we have found the so-called radio apparatus employing a loop antenna to be very satisfactory and we prefer, for most accurate results, to employ a loop antenna in fixed combination with a battery and receiving set so that the entire combination may be rotated about a substantially vertical axis until the telephone or other indicating instrument of the set indicates minimum signals from the distant station received by the loop.

A series of such observations taken at different points over any horizontal field will indicate a constant direction wherever the sub-surface formation is homogeneous but where there is a difference in the electrical conductivity of portions of the earth below the surface, there will be a distortion in the path of current flowing through the sub-surface strata and there will be a corresponding distortion in the direction of the plane of the electromagnetic field generated by said current and consequently an indication observable in the radio receiving set at the surface over the disturbance in the conductivity and therefore over the boundary between the mass of relatively higher or lower resistance.

By referring to the accompanying drawings our invention will be made clear:

Figure 1 is a vertical cross section through a hypothetical oil field in which it is desired to outline the shape and size of the subterranean oil body.

Figure 2 is an end section taken on the line II—II of Figure 1.

Figure 3 is a plan section of Figure 1 on the line III—III thereof.

Figure 4 is a plan of the fields in the strata of Figure 3.

Figure 5 is a graph of the electromagnetic field showing the directions found upon the earth's surface above the oil body of Figure 3, wherein the abnormal points of observation are connected together, and give the outline of the oil body of Figs. 1 to 3.

Throughout the figures similar numerals refer to identical parts.

A body of subterranean oil of unknown extent is indicated by the numeral 1, located at an unknown depth below the surface 2.

At some distant point a generating station setting up electric currents of radio frequency is established. Such stations are well known and no such station is shown in the drawings, but the current from such a station, passing through the subterranean strata is indicated in Figure 3 by a series of lines as 3—3, 4—4—4, 5—5—5.

The relatively homogeneous media surrounding the body of oil 1 is indicated by the numeral 6, and the electric currents 3, 4, 5 will therefore traverse the madia 6 in relatively straight lines.

If, in the path of the said currents there now be interposed a large mass of non-conductor, as for example the body of oil 1, the current lines in whose path said body is interposed, will become distorted as indicated in those portions of the current lines 4 and 5 that seek a path around the oil body 1.

As long as the current flow is continuous and parallel as indicated by the lines 3—3 and straight portions of the current lines 4 and 5, the successive electro-magnetic fields will remain parallel with each other, and will be as indicated by the path graphs 8, 9, 10 and 11 of Fig. 1 and these will be represented by the lines 8, 9 10 and 11 in Fig. 3, whereas the planes of the electro-magnetic field established along the line of current flow 4—4 where this flow has been distorted as at 12, and 13 will now be correspondingly displaced as indicated by the paths 14, 15 for example.

The angle of these fields of disturbance being plotted as shown at 14, 15, in Fig. 4 at once indicates the direction of the subterranean current flow around the object of different conductivity and the connecting of the several observations of irregularity then produces the outline of Fig. 4 correctly portraying the position vertically thereunder, of a mass of material having a different electric conductivity from the surrounding media.

It is to be understood that the propagation of an electro-magnetic field about an electric current path in a subterranean strata will be established in a plane at right angles to the direction of current flow vertically therebelow and that such a field will therefore be in a substantially vertical plane which will cut the loop antenna of a radio receiving set properly positioned on the earth's surface.

By rotating the said loop about the vertical axis the voltage induced in the said loop by the said magnetic field may be varied until a zero effect will be produced upon the receiving instrument and may be detected, for example, by the use of ear phones; and in that way a reading of the horizontal angular position of the electro-magnetic field may be determined for any point with respect to any fixed direction as for example the direction passing through the receiving set and the source of electric wave propagation; that is, the sending station.

For the sake of simplicity we have shown and described but one plane of electric current flow and resulting magnetic fields. It is to be understood, however, that the signals received in the loop of our receiving set are the result of impulses of a large number of electromagnetic fields set up through all the strata under the receiving instrument including as a portion thereof, the strata containing the mass of different electric conductivity.

The disturbances in the electromagnetic field or fields occasioned by the alteration in the paths or lines of current flow through the strata containing the mass of different conductivity, are but one of the factors going to make up any received signal; but to whatever degree such disturbances may vary from an impulse received from a homogeneous media, then to that degree will the angularity of the magnetic field be distorted and an indication thereof rendered to the observer.

The resulting electro-magnetic field disturbances on the surface of the earth indicated on our receiving instrument will then be as shown graphically in Fig. 5.

The resulting indications are, of course, derived from the large number of impulses propagated on substantially straight lines, but where the substances of different conductivity are imposed in their paths there will be distortions around or through such substances according to their relative conductivity to the media, and the loop angles observed on the ground surface will be distorted not only over the borders of such masses but immediately adjacent to and especially within the borders of said masses due to the components of currents straying around the masses through the adjacent paths of least resistance.

There will consequently be variations from the constant angle observed within and adjacent to the borders of said masses due particularly to currents straying over and under the said masses.

In the example of the application of our process above set forth we have assumed a substance of relatively less conductivity than the surrounding medium. The indicated electromagnetic fields would however, be distorted over the edges of a substance of relatively greater conductivity also and hence our method is applicable to various other discovery investigations than that of oil and its applicability to such will now be apparent to those skilled in this art and we claim all such.

Reference is herein made to our co-pending application Serial No. 41,929, filed July 7, 1925, wherein is set forth more explicitly the apparatus by which we prefer to practice the method herein set forth.

We claim:

1. The method for locating a subterranean area of electrical conductivity differing from that of the surrounding media which comprises utilizing a radiation field propagated from a radio-transmitting station located at a remote point on the earth's surface, and of recording at spaced points on the earth's surface directly above said area the horizontal angular setting of a radio-receiving loop antenna relative to a horizontal base line, when the loop is arranged to receive at minimum sound signals carried by said radiation.

2. The method as specified in claim 1, plus plotting the angular readings of said loop to scale on a map and connecting the readings departing from the normal so as to plot the area of differing electrical conductivity.

3. The method of determining the location of subterranean substances positioned within media of different electrical conductivity, which consists of establishing a radio-transmitting station at a point on the earth's surface remote from the area to be explored, then of determining the direction of the wave front of the radiation field emitted by said station at each of a plurality of spaced points on the surface of the earth directly above said area, whereby the points at which said field is distorted from the general direction of said field indicate the outline of said subterranean substance at the surface.

4. The method of determining the projected outline of subterranean substances positioned in media having a different electrical conductivity from that of the substance which consists in determining at spaced points on the surface of the earth vertically above the outline of the substance the angle of vertical planes parallel to the wave front of a radiation field propagated from a remote radio sending station, with respect to a horizontal base line on the area under study, and then plotting the same and connecting the points at which the said field departs from its general direction, whereby the said outline is mapped.

5. The method for locating a subterranean area of electrical conductivity differing from the surrounding media which comprises the emission of a radiation field propagated from a radio-transmitting station located at a fixed remote point on the earth's surface, and of recording at a plurality of spaced points on the earth's surface vertically above said area the distortion of said field as denoted by the varying horizontal angular settings, or bearings, indicated by a directional radio-receiving instrument, relative to a horizontal base line, as said instrument is positioned at said points, and plotting said readings whereby the distorted readings form a map of said subterranean area.

6. The method for locating a subterranean mass of differing electrical conductivity from that of the surrounding media which comprises the reception of a radiation field, from a radio transmitting station located at a remote fixed point, at spaced points on the earth's surface directly above said mass and its surrounding media, by means of directional radio receiving apparatus, determining the apparent bearing of the transmitting station at said spaced points by means of said apparatus, and comparing the observed bearings with the true bearings.

7. The method of geophysically prospecting for oil consisting of determining the apparent bearings of a distant radio transmitting station at spaced points above a geological structure, comparing the apparent bearings with the true bearings of said station, correlating the differences between said true and apparent bearings, thereby determining the line of separation between oil and salt-water in oil-bearing strata by reason of said differences in bearings, which are the result of the presence of said line of separation, appearing and being observed, directly above said line of separation between oil and salt-water.

8. The method of studying subsurface geological conditions, or structure, consisting of determining the apparent bearings of a distant radio transmitting station at spaced points on the terrain to be studied, comparing the apparent bearings with the true bearings of said station, correlating the differences between said true and apparent bearings, thereby having made apparent at the surface the existence of any mineralization or non-uniform distribution of subsurface moisture content, differences in electrical conductivity resulting therefrom being made apparent directly thereabove by differences between the true and apparent bearings observed.

9. The method of tracing geological faults, consisting of determining the apparent bearings of a distant radio transmitting station at spaced points above the faulted formations, comparing the apparent bearings with the true bearings of said station, correlating the differences between said true and apparent bearings, thereby detecting at the surface, at points directly above the trace of the fault in subsurface conductive strata, the effect of the discontinuity of the conductive strata upon the propagation of the radiation field from said distant radio transmitting station.

CARL H. BEAL.
CHARLES E. MILLER.